INVENTOR.
C.L. OSBURN, JR.

BY Hudson and Young

ATTORNEYS

United States Patent Office 3,057,695
Patented Oct. 9, 1962

3,057,695
SAFETY SYSTEM
Carl L. Osburn, Jr., Bartlesville, Okla., assignor to Phillips Petroleum Company, a corporation of Delaware
Filed Jan. 3, 1961, Ser. No. 80,350
19 Claims. (Cl. 23—259.5)

This invention relates to a safety system. In one aspect this invention relates to a safety system which can be employed to stop flow of a reactant or reactants to a reactor under emergency conditions. In another aspect this invention relates to a safety system for preventing explosions in plant operations involving the burning of a combustible mixture. In still another aspect this invention relates to a safety system for a carbon black plant.

In modern complex processing systems wherein one or more reactants are passed to and reacted in a reactor, it is sometimes desirable to quickly terminate the flow of said reactants under emergency conditions to prevent the development of fire or explosion hazards, or other undesirable operating conditions. This is particularly true of a carbon black plant wherein a vaporized hydrocarbon charging stock is cracked under severe conditions within a plurality of reactors in the presence of gases resulting from the combustion of fuel gas and air. From the reactors, the effluent gas containing carbon black is fed through suitable headers to a precipitator unit wherein the carbon black is electrostatistically separated from the gases, which pass to the atmosphere through a stack. The plant may also include one or more cyclone separators and one or more bag filter units to effect further separation of the carbon black from the effluent gases.

The effluent gas from the carbon black reactor contains carbon black suspended in a stream of flue gases which contains substantial quantities of hydrogen, e.g., 12 volume or mol percent, and carbon monoxide, e.g., 12 volume or mol percent, on a dry basis, as well as traces of hydrocarbons. During normal operations of the carbon black plant, air for the process is employed but sufficient oxygen is not present in the system to give rise to an undesirable combustible or explosive mixture, since a deficiency of air is employed and substantially all of the oxygen is normally consumed during combustion. However, in the event of a pressure failure within the plant production system, air may enter the reactor, smoke header, quench unit, air lines, etc., due to the reduced pressure in the system and give rise to hazardous operating conditions which may result in explosions due to the presence of combustible or explosive gaseous mixtures which can be ignited through contact with the heated surfaces of equipment. A pressure failure in the system may also be caused by a power failure which, for example, may result in the disabling of the blowers supplying process air to the system.

In addition, a failure in the process air supply will cause combustion gases from the reactor to back up into the air supply header with the result that a further explosion hazard may occur. Failure of process air supply can result in severe coking in the reactor in addition to improper proportions of process air and fuel.

Similarly, interruption or failure of the tangential fuel supply will give rise to undesirable operating conditions, especially where the supply of process air is continued.

Failure in the supply of hydrocarbon charging stock can result in undesirable coking in the preheater tubes in some plants since the residual heat in the red-hot refractories of the preheater is generally sufficient to coke a substantial portion of the charging stock. In many cases the coils or tubes in which the charging stock is being preheated have been actually ruined and have required replacement with the consequent measurable increase in the cost of carbon black production.

Manual shut-down of the various supply sources to prevent hazardous conditions from arising have often unsatisfactory because of the inefficiencies and uncertainties of manual shut-down systems.

Saftey shut-down systems known to the prior art usually employ, or are dependent upon, to some extent at least, some sort of an electrical device or devices. Thus, in the event of a power failure the safety shut-down systems or apparatus of the prior art are inoperative. The present invention provides a master pneumatically operated shut-down actuator which operates entirely independent of any electrical devices.

Broadly speaking, the invention comprises an interlocking system of pneumatically operated control instruments which can be employed to close valves and stop flow in one or more conduits supplying one or more rectants to a reactor under emergency conditions responsive to a change in a processing variable in the processing system. If desired, other valves in purge gas conduits, quench water conduits, fire water conduits, etc. can be operatively connected into the control system of the invention so as to simultaneously open upon the closing of said valves in said reactant conduits, and thus further protect the processing equipment.

An object of this invention is to provide a pneumatically operated shut-down system which is operable independently of any electrical devices. Another object of this invention is to provide an improved automatic safety shut-down system which can be employed to stop flow of a reactant or reactants to a reactor under emergency conditions. Another object of this invention is to provide an improved automatic safety shut-down system which can be employed in a process involving the burning of combustible mixtures. Another object of this invention is to provide an automatic safety shut-down system for use in a carbon black process whereby failures of electric power, process air, fuel, or hydrocarbon charging stock supplies will not give rise to explosion hazards or other undesirable operating conditions. Another object of this invention is to provide an improved pneumatically operated safety shut-down system applicable to carbon black producing plants, or other processing plants, characterized by reduced maintenance costs, quick and reliable response in the event of process supply failures, and safety. Other aspects, objects, and advantages of the invention will be apparent to those skilled in the art in view of this disclosure.

Figure 1:
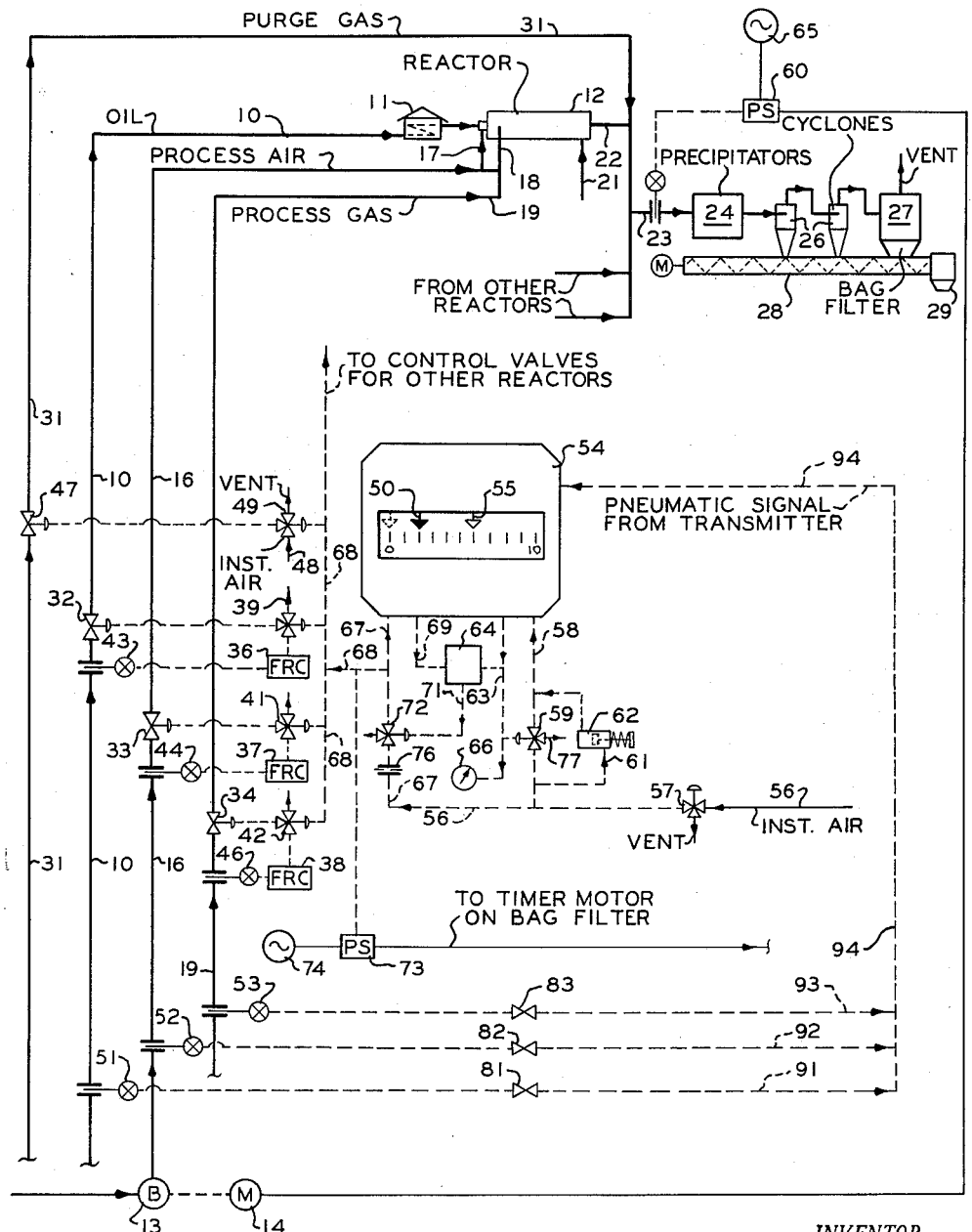
FIGURE 1 is a diagrammatic illustration of the safety system of this invention applied to a carbon black producing plant.

Referring now to said drawings, the invention will be more fully explained, particularly as applied to a carbon black producing plant. Although a carbon black plant ordinarily includes a plurality of reactors, only one reactor has been shown since the manner in which the safety system of the invention applies to the other reactors will become readily apparent from the following description. In said drawings, like reference numerals have been employed to designate like elements. It is to be understood that said drawings are schematic in nature. Many valves, pressure gauges, relays, air supply conduits, etc. not necessary for explaining the invention to those skilled in the art, have been omitted so as to simplify said drawings. All of the individual elements shown in said drawings are commercially available conventional equipment. The present invention resides in combinations and arrangements of said elements to obtain the improved results as described herein.

Referring now to FIGURE 1, a hydrocarbon charging stock, such as a heavy gas oil or natural gas, is supplied by means of conduit 10 from a source not shown to preheater 11 wherein said charging stock is preheated and then introduced into the feed end of reactor 12. Although here indicated as being a separate heater, said preheater 11 can be a heat exchanger installed in the effluent end of said reactor so that said hydrocarbon charging stock is preheated by means of heat exchange with the reaction products from said reactor. Process air is supplied from blower 13, operated by motor 14, through conduit 16 to said reactor 12. A portion of said process air is passed through conduit 17 and introduced axially with said hydrocarbon charging stock. The remainder of said process air is passed through conduit 18 and is introduced tangentially into said reactor together with a fuel gas, such as natural gas, which is passed under pressure through conduit 19 from a source not shown. The mixture of fuel and air in said conduit 18 is in combustible proportions. A water line 21 is provided for the introduction of water into the after end of said reactor to quench the reaction. Further cooling of the reactor effluent is effected in the smoke header 22 by radiation and convection to the atmosphere or by means of an external jacket (not shown) with suitable cooling fluid. Still further cooling of the reactor effluent can be, and usually is, effected in a vertically elongated quench tower (not shown) wherein said effluent is contacted with a countercurrent spray of water. The cooled reactor effluent is conducted by means of conduit 23 into suitable carbon black recovery equipment which can include electrical precipitator 24, one or more cyclones 26, and one or more bag filter units 27. The carbon black collected in each of said separating units is collected in screw conveyor 28 for delivery to pulverizer and/or pelleting mill 29. Another supply conduit 31 is provided for the introduction of a purge gas, such as steam or other inert gas, into smoke header 22 under the conditions described further hereinafter.

Flow through said supply conduits 10, 16, and 19 is controlled by means of motor valves 32, 33, and 34, respectively. Each of said motor valves 32, 33, and 34 is a conventional direct acting pressure responsive motor valve which is held open by means of the air or other fluid pressure applied to the diaphragm in its motor. Said control valves 32, 33, and 34 in normal operation of the plant are controlled by flow recorder controllers 36, 37, and 38, respectively, operating in known conventional manner, and connected to said control valves by means of three-way pilot motor valves 39, 41, and 42, respectively. Thus, responsive to the signal from pressure transmitters 43, 44, and 46, respectively, the air output from said flow recorder controllers 36, 37, and 38 is passed through said three-way pilot motor valves 39, 41, and 42, respectively, to the respective control valves 32, 33, and 34. Said three-way motor valves 39, 41, and 42 are normally biased to the position permitting said control, i.e., their vent ports are closed.

Control valve 47 in purge gas conduit 31 in normal operation of the plant is maintained in closed position by means of instrument air introduced via conduit 48 and three-way pilot motor valve 49 to the diaphragm of said control valve 47. Said three-way motor valve 49 is normally biased to the position permitting said control, i.e., its vent port is closed.

There are also provided in said conduits 10, 16, and 19 additional pressure transmitters 51, 52, and 53 respectively for transmitting a pneumatic signal responsive to the pressure in said conduits to the pressure responsive element 103 (described further hereinafter) of double duty on-off control instrument 54. All of the above described transmitters are conventional commercially available transmitters, such as an Ashcroft Model 1250 Pneumatic Pressure Transmitter, and transmit a 3 to 15 p.s.i. pneumatic signal in accordance with the pressure in the conduit to which they are connected. Said control instrument 54 is a commercially available instrument from the Taylor Instrument Company as Taylor Fulscope Type X190RF 237 Double Duty On-Off Controller.

Although said control instrument 54 is a commercially available instrument, it is believed it will be helpful in explaining the invention to describe said instrument in more detail. Said control instrument 54 comprises a reverse action first pneumatic controller and a direct action second pneumatic controller interconnected and operated by a single pressure responsive element. Thus, said control instrument is provided with first and second baffle units mounted on a common shaft. One of said baffle units is reverse acting, i.e., with an increase in the processing variable signal supplied thereto there is obtained a decrease in the air output. The other of said baffle units is direct acting, i.e., with an increase in the processing variable signal supplied thereto there is obtained an increase in air output. Each of said baffle units is provided with its own air relay valve and each is provided with its own air supply conduit and air output conduit. Both of said baffle units are connected by means of the same lever arm to, and are operated by, a single pressure responsive element such as a bellows. Thus, when said pressure responsive element moves, the air output from one of said baffle units will be increased and the air output of the other baffle unit will be decreased, thus increasing or decreasing the air output from the respective controllers of which said baffle units are a part.

Figure 2:
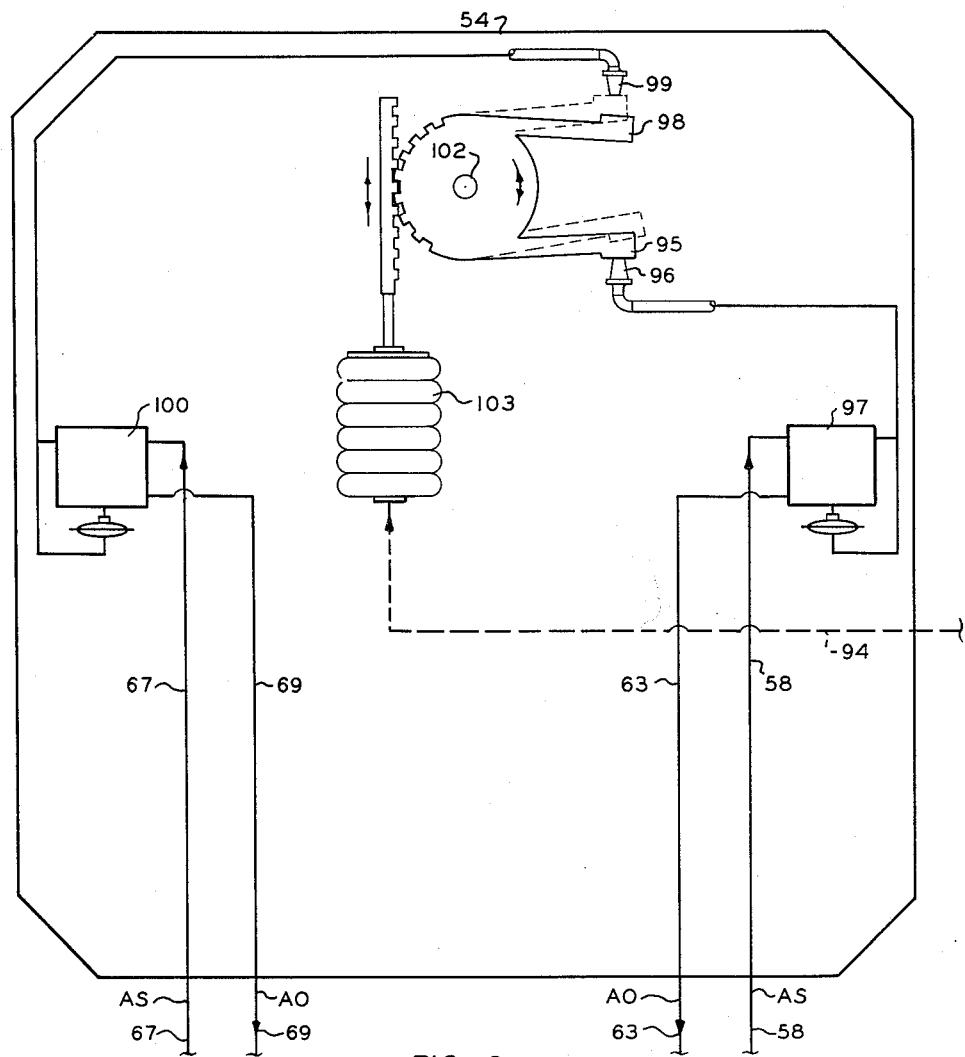
FIGURE 2 is a schematic representation of one of the control instruments employed in the safety system of the invention.

Referring now to FIGURE 2, there is shown a schematic representation of a double duty on-off controller which will illustrate the operation of said control instrument 54. It is to be understood that said FIGURE 2 is schematic only and does not represent the actual construction of such an instrument and is intended only to illustrate its operation. Many details such as means for setting the control point of the instrument, the set pointer, recording pen, etc., not necesary for an explanation to those skilled in the art have been omitted. As here illustrated, the reverse acting first controller comprises a first baffle 95, a first nozzle 96 and a first air relay valve 97. Said air relay valve 97 receives a supply of instrument air from a first air supply conduit 58 and operates in conventional manner to deliver its air output through a first air output conduit 63, depending upon whether or not baffle 95 is resting on nozzle 96.

The direct acting second controller comprises a second baffle 98, a second nozzle 99 and a second air relay valve 100. Said air relay valve 100 receives a supply of instrument air from a second air supply conduit 67 and operates in conventional manner to deliver an air output through a second air output conduit 69, depending upon whether or not baffle 98 is resting upon nozzle 99.

It is to be noted that both of said controllers are interconnected in that both of said baffles 95 and 98 are connected to a common shaft 102 which is actuated, by means of the gear arrangement shown, by a single pressure responsive element such as bellows 103. Thus, upon a decrease in the pneumatic signal in conduit 94 to a value below the set point of the instrument, bellows 103 will contract, baffle 95 will move to open nozzle 96, and air output from air relay valve 97 through conduit 63 will be initiated assuming that air is being supplied through conduit 58. At substantially the same time, baffle 98 will move to close nozzle 99 and the air output from air relay valve 100 through conduit 69 will be shut off, assuming that air is being supplied through conduit 67.

Referring again to FIGURE 1, there is provided a main instrument air conduit 56 connected to a source of instrument air (not shown) and having three-way valve 57 disposed therein. A first air supply conduit 58 is connected to said instrument air conduit and to said reverse acting first controller comprising said first baffle unit 95 and said first air relay valve 97 in said control instrument 54. A first three-way motor valve 59 is disposed in said first air supply conduit. A bypass conduit 61 having a normally closed valve 62 therein is connected into said first air supply conduit upstream and downstream of said first three-way motor valve. Said valve 62 can be any suitable type of normally closed valve. As here shown, it is a spring loaded push button valve which is opened by depressing the valve stem to place the two portions of the bypass conduit into communication. A first air output conduit 63 extends from said first air relay valve 97 to an air selector relay 64 and to the motor of said first three-way motor valve 59. A pressure gauge 66 is provided in said first air output conduit 63. A second air supply conduit 67 is connected to said instrument air conduit 56, to said direct acting second controller comprising said second baffle unit 98 and said second relay valve 100 in said control instrument 54, and to a header 68 which is in turn connected to the motors of said pilot motor valves 39, 41, 42, and 49. A second air output conduit 69 extends from said second air relay valve 100 to said air selector relay 64. A third air output conduit 71 extends from the outlet of said air selector relay 64 to the motor of a second three-way motor valve 72 which is disposed in said second air supply conduit 67. A pressure switch 73 is operatively connected to header 68 and into the leads from power source 74 for interrupting the power supply to the timer motor (not shown) on the bag filters responsive to a decrease in pressure in said header 68. The restrictive orifices 76 and 77 are provided to insure proper switching of three-way motor valves 59 and 72 as described further hereinafter.

In the operation of the invention, the shut-down system is pressured up to 20 pounds by means of the instrument air supplied through conduit 56 and is actuated by depressuring the system. The double duty on-off controller 54 is set for the desired low pressure shut-down pressure, i.e., the minimum pressure in one of the supply conduits 10, 16, or 19 which will trip the shut-down system. This setting is indicated by the set pointer 50 in said instrument 54. In many carbon black plants, it will be desirable to cause the plant to be automatically shut down when the pressure in the process air supply conduit reaches a predetermined minimum. Thus, the set pointer is set at said predetermined minimum pressure, for example 2 p.s.i., and when the unit or plant is down, the transmitter 52 in process air conduit 16 will be transmitting 3 p.s.i. which corresponds to 0 p.s.i. in said conduit 16. The process pressure in said conduit 16 is continuously indicated by the process pressure pointer 55 in instrument 54 and will read 0 when the plant is down as indicated by the dotted line position of said process pressure pointer.

Assuming that all other prerequisites necessary to starting up the plant have been compiled with, the operator will depress the pushbutton in valve 62 which will permit instrument air from conduit 56 to bypass valve 59 and put 20 pounds air supply to said air relay valve 97 of reverse acting first controller in control instrument 54. Said first controller will supply 20 pounds air output pressure to first air output conduit 63 since the process air pressure conduit 16 will be at zero or below the shut-down set pointer. Said air output in conduit 63 will pass to the motor of three-way motor valve 59 and switch said valve from its vent position to the position permitting flow therethrough. The operator holds valve 62 open until 20 pounds air pressure is registered on gauge 66. Said air output in conduit 63 will also pass to air selector relay 64 which is adapted to select and transmit the higher of two input air pressures thereto. Since only one stream of air is now being put to said air selector relay, it will be passed via conduit 71 to the motor of second three-way motor valve 72 and will switch said valve 72 from its vent position to its other position permitting flow of instrument air through conduit 67 to said air relay valve 100 of said second controller in control instrument 54. Since said second controller is direct acting, there will be no air output therefrom until the process pressure pointer 55 reaches the set pointer. If the blower 13 has not been previously started, it is now started and when the process air pressure in conduit 16 has reached a value whereby the process pointer reaches the set pointer, said second controller will deliver a 20 pound air output through conduit 69 to air relay 64. When the process pressure increases one scale division (about 0.1 p.s.i.) above the set pointer, the air output from said first controller drops to 0 p.s.i. Since the air output pressure from said second controller is now the highest air pressure being delivered to said air selector relay 64, it will be passed through conduit 71 to the motor of second three-way valve 72 and said second three-way motor valve 72 will remain open. When the air output from said first controller drops to 0 p.s.i., said first three-way motor valve 59 is switched to its vent position which shuts off air supply to said first air controller and vents any air trapped in that part of the system supplied by first air supply conduit 58. Said decrease to 0 p.s.i. is indicated by pressure gauge 66. The shut-down system is now triggered to shut the process down in the event the pressure in process air conduit 16 decreases below the 2 p.s.i. setting of the set pointer 50 in instrument 54.

In the event of an emergency such as a low pressure in one of conduits 10, 16, or 19, the shut-down apparatus will automatically shut down the plant by depressuring the shut-down system. For example, if the process air pressure in conduit 16 drops below the predetermined minimum pressure of 2 p.s.i., for example, the output air from said second controller will drop to 0 p.s.i., and since no output air is then being delivered to air selector relay 64, three-way valve 72 will be switched, blocking off the supply of air to said second controller and also to header 68. With the blocking of air supply to header 68, the pilot motor valves 39, 41, and 42 will be switched to their vent positions, closing off the supply of air from flow recorder controllers 36, 37, and 38, and air pressure will be vented from the diaphragms of control valves 32, 33, and 34, causing said control valves to close, thus shutting down the flow of reactants to reactor 12. Pilot motor valve 49 is also switched to its vent position, closing off the supply of instrument air to control valve 47, but since control valve 47 is a reverse acting valve, it will open upon the venting of air from its diaphragm and thus will admit purge steam through conduit 31 to smoke header 22. Said control valves 32, 33, and 34 will not open and control valve 47 will not close until the plant operator is ready and again depresses pneumatic pushbutton switch 62 to initiate the start up sequence previously described.

Pressure switch 60 is operatively connected to conduit 23 by means of the transmitter shown, and to power source 65 and motor 14 in conventional manner, for interrupting the power supply to said motor in the event of high pressure beyond a predetermined maximum in said conduit 23. Such a high pressure can be caused by a blockage or other malfunction in the carbon black recovery system. Thus, a high pressure in conduit 23 will shut down blower motor 14 which will cause the process air pressure in conduit 16 to decrease below the permitted predetermined minimum, and the safety system will be actuated as previously described to shut down the entire plant.

In some carbon black plants, provision is made to put the hydrocarbon charge in conduit 10 on recycle instead of stopping flow completely as just described. Such a system is described in U.S. Patent 2,883,271 issued to E. N. Pennington et al. on April 21, 1959. It is within the scope of the present invention to include such a recycle system and connect it into the shut-down system. This could be accomplished in the plant here illustrated by installing control valve 32 between preheater 11 and reactor 12 and connecting a recycle conduit having a control valve therein between preheater 11 and said control valve 32. In such a system, as control valve 32 closes, said control valve in said recycle conduit would open and permit recycle of the hydrocarbon charge to storage, thus preventing possible coking of the tubes in preheater 11 when flow of oil stops.

In most carbon black plants it is preferred that the shut-down system be actuated by low-pressure in process air conduit 16 with the pneumatic signal to instrument 54 being initiated by transmitter 52. However, the shut-down system can be triggered by a low pressure in conduit 10 or conduit 19 and transmitters 51 and 53 are provided for this purpose. Obviously, only one of said transmitters can be tied into instrument 54 at any one time and for this reason block valves 81, 82, and 83 are provided in pneumatic conduits 91, 92, and 93 respectively so as to enable a choice of the process variable which is desired to trigger the shut-down system, and which is delivered to instrument 54 via conduit 94.

In the event of an emergency caused by some circumstance other than low pressure in one of said conduits 10, 16, and 19, manual three-way valve 57 is provided in instrument air conduit 56. In normal operation of the plant, said valve 57 is positioned to permit flow straight through. In its other position valve 57 will block flow of air through conduit 56 and will vent pressure from the shut-down system including conduit 67 and header 68. Said three-way valve 57 thus provides means for manually shutting down the process in the event of an emergency. Said valve 57 is usually mounted on the control panel in the control room for ready access. Valve 62 is also mounted on said control panel.

While the invention has been particularly described as applicable in a carbon black process, it should be understood that the invention is not limited thereto. The invention is also particularly applicable to any process involving the burning of combustible mixtures, with or without other reactants.

It is also believed clear the invention is applicable to any process where one or more reactants are being passed to a reactor and it is desirable to provide means for terminating the flow of said reactants quickly in the event of an emergency.

Also, while the invention has been described as operative responsive to changes in fluid pressure in a conduit, the invention is not so limited. It is believed clear the invention can be adapted to be responsive to other processing variables, for example, temperature. In such an event, it would only be necessary to employ a transmitter which would convert a temperature measurement to a pneumatic signal. Such instruments are commonly known and are commercially available. One such instrument would be a Taylor "Sensaire" 202T Temperature Transmitter. This instrument converts a temperature measured by means of a bulb thermal system to a pneumatic signal. Such an instrument is commonly used when the temperature measured is below about 800° F. When the temperature measured is above 800° F., a Taylor 700T Potentiometer Transmitter can be used. This instrument includes an electropneumatic transducer which converts a signal from a D.C. millivolt or resistance primary element to an electrical and/or pneumatic output.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. In apparatus for carrying out a process, said apparatus including a conduit having a pressure responsive control valve therein, a pneumatic control system for said valve, said system comprising: a reverse action first pneumatic controller adapted to maintain a positive air output when a pneumatic signal transmitted thereto responsive to a change in a measured process variable within said apparatus is below a predetermined minimum value and to maintain a zero air output when said pneumatic signal is above said predetermined minimum; a direct action second pneumatic controller adapted to maintain a zero air output when said pneumatic signal is below said predetermined minimum and to maintain a positive air output when said pneumatic signal is above said predetermined minimum; a single pressure responsive element connected to both of said controllers for operating same; a transmitter for transmitting said pneumatic signal to said pressure responsive element responsive to changes in said measured process variable within said apparatus; first conduit means for supplying instrument air to said first controller only when said pneumatic signal is below said predetermined minimum value; and second conduit means for supplying instrument air to said second controller and said control valve only when said pneumatic signal is above said predetermined minimum.

2. In a system for burning a combustible gaseous mixture including a reactor, first, second, and third conduits for supplying respectively to said reactor fuel under pressure, process air under pressure, and a hydrocarbon charging stock under pressure, a pneumatic safety shut-down system comprising: a pressure responsive control valve in each of said conduits; a reverse acting first pneumatic controller adapted to maintain a positive air output when a pneumatic signal transmitted from a pressure sensing means described hereinafter is below a predetermined minimum value and to maintain a zero air output when said pneumatic signal is above said predetermined minimum value; a direct acting second pneumatic controller adapted to maintain a zero air output when said pneumatic signal is below said predetermined minimum value and to maintain a positive air output when said pneumatic signal is above said predetermined minimum value; a single pressure responsive element connected to both of said controllers for actuating same; pressure sensing means in each of said conduits for transmitting said pneumatic signal to said pressure responsive element, only one of said sensing means being in communication with said element at any one time; first air supply conduit means for supplying instrument air to said first controller only when said pneumatic signal is below said predetermined minimum value; and second air supply conduit means for supplying instrument air to said second controller and to said control valves only when said pneumatic signal is above said predetermined minimum value, said control valves thus closing when said pneumatic signal is below said predetermined value.

3. In a system for producing carbon black including a reactor, first, second, and third conduits for supplying respectively to said reactor fuel under pressure, process air under pressure, and a hydrocarbon charging stock under pressure, a pneumatic safety shut-down system comprising: a pressure responsive control valve in each of said conduits; a reverse acting first pneumatic controller adapted to maintain a positive air pressure output when a pneumatic signal transmitted from a pressure sensing means described hereinafter is below a predetermined minimum value and to maintain a zero air output when said pneumatic signal is above said predetermined minimum value; a direct acting second pneumatic controller adapted to maintain a zero air output when said pneumatic signal is below said predetermined minimum value and to maintain a positive air output when said pneumatic signal is above said predetermined minimum value; a single pressure responsive element connected to both of said controllers for actuating same; pressure sensing means in each of said conduits for transmitting said pneumatic signal to said pressure responsive element, only one of said sensing means being in communication with said element at any one time; first air supply conduit means for supplying instrument air to said first controller only when said pneumatic signal is below said predetermined minimum value; and second air supply conduit means for supplying instrument air to said second controller and to said control valves only when said pneumatic signal is above said predetermined minimum value, said control valves thus closing when said pneumatic signal is below said predetermined minimum value.

4. A pneumatic safety shut-down system according to claim 3 wherein a pressure sensing means is provided in said first conduit only.

5. A pneumatic safety shut-down system according to claim 3 wherein a pressure sensing means is provided in said second conduit only.

6. A pneumatic safety shut-down system according to claim 3 wherein a pressure sensing means is provided in said third conduit only.

7. In a system for producing carbon black including a reactor, first, second, and third conduits for supplying respectively to said reactor fuel under pressure, process air under pressure, and a hydrocarbon charging stock under pressure, a fourth conduit for conveying reaction products from said reactor to carbon black recovery equipment, and a fifth conduit for supplying a purge gas to said fourth conduit, a pneumatic safety shut-down system comprising: a pressure responsive control valve in each of said first, second, third and fifth conduits; a reverse action first pneumatic controller adapted to maintain a positive air pressure output when a pneumatic signal transmitted from a pressure sensing means described hereinafter is below a predetermined minimum value and to maintain a zero air output when said pneumatic signal is above said predetermined minimum value; a direct action second pneumatic controller adapted to maintain a zero air output when said pneumatic signal is below said predetermined minimum value and to maintain a positive air output when said pneumatic signal is above said predetermined minimum value; a single pressure responsive element connected to both of said controllers for actuating same; pressure sensing means in each of said first, second, and third conduits for transmitting said pneumatic signal to said pressure responsive element, only one of said sensing means being in communication with said element at any one time; first air supply conduit means for supplying instrument air to said first controller only when said pneumatic signal is below said predetermined minimum value; and second air supply conduit means for supplying instrument air to said second controller and to said control valves only when said pneumatic signal is above said predetermined minimum value, said control valves in said first, second, and third conduits closing and said control valve in said fifth conduit opening when said pneumatic signal is below said predetermined minimum value.

8. A pneumatic safety shut-down system according to claim 7 wherein a pressure sensing means is provided in said first conduit only.

9. A pneumatic safety shut-down system according to claim 7 wherein a pressure sensing means is provided in said second conduit only.

10. A pneumatic safety shut-down system according to claim 7 wherein a pressure sensing means is provided in said third conduit only.

11. In a system for producing carbon black including a reactor, first, second, and third conduits for respectively supplying to said reactor fuel under pressure, process air under pressure, and a hydrocarbon charging stock under pressure, a pneumatic safety shut-down system comprising: a pressure responsive control valve in each of said conduits; a reverse action first pneumatic controller and a direct action second pneumatic controller interconnected and operated by a single pressure responsive element, said first controller being adapted to maintain a positive air output when a pneumatic signal transmitted from a pressure sensing means described hereinafter is below a predetermined minimum value and to maintain a zero air output when said pneumatic signal is above said minimum value, and said second controller being adapted to maintain a zero air output when said signal is below said minimum value and to maintain a positive air output when said signal is above said minimum value; pressure sensing means in each of said conduits for transmitting said pneumatic signal to said pressure responsive element, only one of said sensing means being in communication with said element at any one time, a first air supply conduit means, having an air motor operated first vent valve therein, for supplying instrument air to said first controller; a first air output conduit from said first controller and in communication with the motor of said first vent valve; a second air supply conduit means, having an air motor operated second vent valve therein, for supplying instrument air to said second controller and to said control valves in said first, second, and third conduits; a second air output conduit from said second controller; and an air selector relay in communication with said first and second air output conduits and the motor of said second vent valve, said relay being operable to select the higher of said two output air pressures and transmit same to said motor of said second vent valve, whereby said second vent valve is maintained in non-venting position and instrument air is supplied to said control valves to maintain same in an open position only when said signal is above said predetermined minimum.

12. In a system for producing carbon black including a reactor, first, second, and third conduits for respectively supplying to said reactor fuel under pressure, process air under pressure, and a hydrocarbon charging stock under pressure, a fourth conduit for conveying reaction products from said reactor to carbon black recovery equipment, and a fifth conduit for supplying a purge gas to said fourth conduit, a pneumatic safety shut-down system comprising: a pressure responsive control valve in each of said first, second, third, and fifth conduits; a reverse action first pneumatic controller and a direct action second pneumatic controller interconnected and operated by a single pressure responsive element, said first controller being adapted to maintain a positive air output when a pneumatic signal transmitted from a pressure sensing means described hereinafter is below a predetermined minimum value and to maintain a zero air output when said pneumatic signal is above said minimum value; and said second controller being adapted to maintain a zero air output when said signal is below said minimum value and to maintain a positive air output when said signal is above said minimum value; pressure sensing means in each of said first, second, and third conduits for transmitting said pneumatic signal to said pressure responsive element, only one of said sensing means being in communication with said element at any one time; a first air supply conduit means, having an air motor operated first vent valve therein, for supplying instrument air to said first controller; a first air output conduit extending from said first controller and in communication with the motor of said first vent valve; a second air supply conduit means, having an air motor operated second vent valve therein, for supplying instrument air to said second controller and to said control valves in said first, second, third, and fifth conduits; a second air output conduit extending from said second controller; and an air selector relay in communication with said first and second air output conduits and the motor of said second vent valve, said relay being adapted to select the higher of the two output air pressures in said air output conduits and transmit same to said motor of said second vent valve, whereby said second vent valve is maintained in non-venting position and instrument air is supplied to said control valves in said first, second, and third conduits to maintain same in an open position and to said control valve in said fifth conduit to maintain same in closed position only when said signal is above said predetermined minimum.

13. In apparatus for carrying out a process, said apparatus including a conduit having a pressure responsive control valve therein, a pneumatic shut-down system comprising: pressure sensing means in said conduit; a double duty on-off control instrument comprising a reverse action first pneumatic controller and a direct action second pneumatic controller interconnected and operated by a single pressure responsive element; a transmitter operatively connected to said pressure sensing means in said conduit for delivering a pneumatic signal to said pressure responsive element in accordance with the pressure in said conduit; first conduit means for supplying instrument air to said first controller only when said pneumatic signal is below a predetermined minimum value; and second conduit means for supplying instrument air to said second controller and said control valve only when said pneumatic signal is above said predetermined minimum value.

14. In a reaction system including a reactor, a conduit for delivering a fluid reactant to said reactor, and a pressure responsive control valve in said conduit, a pneumatic shut-down system comprising: pressure sensing means in said conduit; a double duty on-off control instrument comprising a reverse acting first pneumatic controller and a direct acting second pneumatic controller interconnected and operated by a single pressure responsive element; a transmitter operatively connected to said pressure sensing means and said controller for delivering a pneumatic signal to said pressure responsive element in accordance with the pressure changes in said conduit; an instrument air conduit connected to a source of instrument air; a first air supply conduit means connected to said instrument air conduit and to said first controller; a first three-way motor valve in said first air supply conduit; a by-pass conduit connected into said first air supply conduit upstream and downstream of said first three-way motor valve; a normally closed valve in said by-pass conduit; an air selector relay adapted to select and transmit the higher of two input air pressures introduced thereto; a first air output conduit extending from said first controller to said air selector relay and to the motor of first three-way motor valve; a second air supply conduit means connected to said instrument air conduit, to said control valve, and to said second controller; a second three-way motor valve in said second air supply conduit; a second air output conduit extending from said second controller to said air selector relay; and a third air output conduit extending from said air selector relay to the motor of said second three-way motor valve.

15. In a reaction system including a reactor, at least one conduit for delivering a fluid reactant to said reactor, and a pilot valve actuated pressure responsive motor valve in said conduit, a pneumatic shut-down system comprising: pressure sensing means in said conduit; a double duty on-off control instrument comprising a reverse action first pneumatic controller and a direct action second pneumatic controller interconnected and operated by a single pressure responsive element; a transmitter operatively connected to said pressure sensing means for delivering a pneumatic signal to said pressure responsive element in accordance with the pressure in said conduit; an instrument air conduit connected to a source of instrument air; a three-way valve in said instrument air conduit; a first air supply conduit means connected to said instrument air conduit downstream from said three-way valve and to said first controller; a first three-way motor valve in said first air supply conduit; a by-pass conduit connected into said first air supply conduit upstream and downstream of said first three-way motor valve; a normally closed valve in said by-pass conduit; an air selector relay adapted to select and transmit the higher of two input air pressures introduced thereto; a first air output conduit extending from said first controller to said air selector relay and to the motor of first three-way motor valve; a pressure gauge in said first air output conduit; a second air supply conduit means connected to said instrument air conduit downstream from said three-way valve, to said pilot valve, and to said second controller; a second three-way motor valve in said second air supply conduit; a second air output conduit extending from said second controller to said air selector relay; and a third air output conduit extending from said air selector relay to the motor of said second three-way motor valve.

16. In a system for producing carbon black including a reactor, first, second, and third conduits for respectively supplying to said reactor fuel under pressure, process air under pressure, and a hydrocarbon charging stock under pressure, a pneumatic shut-down system comprising: pressure sensing means in each of said first, second, and third conduits; a double duty on-off control instrument comprising a reverse action first pneumatic controller and a direct action second pneumatic controller interconnected and operated by a single pressure responsive element; first, second, and third transmitters operatively connected to said pressure sensing means in said first, second, and third conduits for delivering a pneumatic signal to said pressure responsive element in accordance with the pressure in said conduits, only one of said transmitters being in communication with said element at any one time; a pilot valve actuated pressure responsive control valve in each of said first, second, and third conduits; an instrument air conduit connected to a source of instrument air; a first air supply conduit connected to said instrument air conduit and to said first controller; a first three-way motor valve in said first air supply conduit; a by-pass conduit connected into said first air supply conduit upstream and downstream of said first three-way motor valve; a normally closed valve in said by-pass conduit; an air selector relay adapted to select and transmit the higher of two input air pressures introduced thereto; a first air output conduit extending from said first controller to said air selector relay and to the motor of said first three-way motor valve; a second air supply conduit connected to said instrument air conduit, to each of said pilot valves for said control valves in said first, second, and third conduits, and to said second controller; a second three-way motor valve in said second air supply conduit; a second air output conduit extending from said second controller to said air selector relay; and a third air output conduit extending from said air selector relay to the motor of said second three-way motor valve.

17. In a system for producing carbon black including a reactor, first, second, and third conduits for respectively supplying to said reactor fuel under pressure, process air under pressure, and a hydrocarbon charging stock under pressure, a fourth conduit for conveying reaction products from said reactor to carbon black recovery equipment, and a fifth conduit for supplying a purge gas to said fourth conduit, a pneumatic shut-down system comprising: pressure sensing means in each of said first, second, and third conduits; a double duty on-off control instrument comprising a reverse action first pneumatic controller and a direct action second pneumatic controller interconnected and operated by a single pressure responsive element; first, second, and third transmitters operatively connected to said pressure sensing means in said first, second, and third conduits for delivering a pneumatic signal to said pressure responsive element in accordance with the pressure in said conduits, only one of said transmitters being in communication with said element at any one time; a pilot valve actuated pressure responsive control valve in each of said first, second, third, and fifth conduits; an instrument air conduit connected to a source of instrument air; a three-way valve in said instrument air conduit; a first air supply conduit connected to said instrument air conduit downstream from said three-way valve and to said first controller; a first three-way motor valve in said first air supply conduit; a by-pass conduit connected into said first air supply conduit upstream and downstream of said first three-way motor valve; a normally closed valve in said by-pass conduit; an air selector relay adapted to select and transmit the higher of two input air pressures introduced thereto; a first air output conduit extending from said first controller to said air selector relay and to the motor of said first three-way motor valve; a pressure gauge in said first air output conduit; a second air supply conduit connected to said instrument air conduit downstream from said three-way valve, to each of said pilot valves for said control valves in said first, second, third, and fifth conduits, and to said second controller; a second three-way motor valve in said second air supply conduit; a second air output conduit extending from said second controller to said air selector relay; and a third air output conduit extending from said air selector relay to the motor of said second three-way motor valve.

18. In apparatus for carrying out a process, said apparatus including a conduit having a pressure responsive control valve therein, and at least one electric motor for furnishing motive power to a unit of said apparatus and adapted to be stopped responsive to a pressure switch, a pneumatic control system for actuating said valve and stopping said motor, said control system comprising: a reverse action first pneumatic controller adapted to maintain a positive air output when a pneumatic signal transmitted thereto responsive to a change in a measured process variable within said apparatus is below a predetermined minimum value and to maintain a zero air output when said pneumatic signal is above said predetermined minimum value; a direct action second pneumatic controller adapted to maintain a zero air output when pneumatic signal is below said predetermined minimum value and to maintain a positive air output when said pneumatic signal is above said predetermined minimum value; a single pressure responsive element connected to both of said controllers for operating same; a transmitter for transmitting said pneumatic signal to said pressure responsive element responsive to changes in said measured process variable within said apparatus; first conduit means for supplying instrument air to said first controller only when said pneumatic signal is below said predetermined minimum value; and second conduit means for supplying instrument air to said second controller and said control valve only when said pneumatic signal is above said predetermined minimum; and a pressure responsive switch in said second conduit means, said pressure responsive switch being operatively connected into the power leads to said motor and adapted to interrupt the supply of power to said motor when the pressure in said second conduit means is below a predetermined minimum value.

19. In a system for producing carbon black including a reactor, first, second, and third conduits for respectively supplying to said reactor fuel under pressure, process air under pressure, and a hydrocarbon charging stock under pressure, a fourth conduit for conveying reaction products from said reactor to carbon black recovery equipment, a fifth conduit for supplying a purge gas to said fourth conduit, a first electric motor for driving a timer in a bag filter unit in said carbon black recovery equipment, and a second electric motor for driving a blower to supply process air to said second conduit, a pneumatic safety shutdown system comprising: a pressure responsive control valve in each of said first, second, third, and fifth conduits; a reverse action first pneumatic controller and a direct action second pneumatic controller interconnected and operated by a single pressure responsive element, said first controller being adapted to maintain a positive air output when a pneumatic signal transmitted from a pressure sensing means described hereinafter is below a predetermined minimum value and to maintain a zero air output when said pneumatic signal is above said minimum value, and said second controller being adapted to maintain a zero air output when said signal is below said minimum value and to maintain a positive air output when said signal is above said minimum value; pressure sensing means in each of said first, second, and third conduits for transmitting said pneumatic signal to said pressure responsive element, only one of said sensing means being in communication with said element at any one time; a first air supply conduit means for supplying instrument air to said first controller only when said pneumatic signal is below said predetermined minimum value; a second air supply conduit means for supplying instrument air to said second controller and to said control valves in said first, second, third, and fifth conduits only when said pneumatic signal is above said predetermined minimum value, said control valves in said first, second, and third conduits closing and said control valve in said fifth conduit opening when said pneumatic signal is below said predetermined minimum value; a first pressure responsive switch in said second air supply conduit means, operatively connected into the power leads to said first electric motor, and adapted to interrupt the supply of power to and stop said motor when the pressure in said second air supply conduit means is below a predetermined minimum value; and a second pressure switch in said fourth conduit, operatively connected into the power leads to said second electric motor, and adapted to interrupt the power supply to and stop said second motor when the pressure in said fourth conduit is above a predetermined maximum value.

References Cited in the file of this patent

UNITED STATES PATENTS

| | | |
|---|---|---|
| 2,785,960 | Ribble et al. | Mar. 19, 1957 |
| 2,883,271 | Pennington et al. | Apr. 21, 1959 |
| 2,886,567 | Wood | May 12, 1959 |